United States Patent
Wen (10) Patent No.: US 10,787,218 B2
(45) Date of Patent: Sep. 29, 2020

(54) SELF-BALANCING SCOOTER AND MAIN FRAME ASSEMBLY THEREOF

(71) Applicant: SHENZHEN XIANGYOU TECHNOLOGY CO., LTD., Shenzhen OT (CN)

(72) Inventor: Xia Wen, Hong Kong (HK)

(73) Assignee: SHENZHEN XIANGYOU TECHNOLOGY CO., LTD., Shenzhen (CN)

( * ) Notice: Subject to any disclaimer, the term of this patent is extended or adjusted under 35 U.S.C. 154(b) by 148 days.

(21) Appl. No.: 16/015,269

(22) Filed: Jun. 22, 2018

(65) Prior Publication Data

US 2018/0297660 A1  Oct. 18, 2018

Related U.S. Application Data

(63) Continuation of application No. PCT/CN2016/096972, filed on Aug. 26, 2016.

(51) Int. Cl.
  *B62K 11/02* (2006.01)
  *B62J 11/19* (2020.01)
  *B62K 11/00* (2006.01)
  *B62J 11/13* (2020.01)

(52) U.S. Cl.
  CPC ............... *B62K 11/02* (2013.01); *B62J 11/19* (2020.02); *B62K 11/007* (2016.11); *B62J 11/13* (2020.02)

(58) Field of Classification Search
  CPC .... B62K 11/007; A63C 2203/40; B62J 11/13; B62J 11/19; F16C 19/163; F16C 2226/72; F16C 2226/76; Y10T 403/32591; Y10T 403/32557; Y10T 403/32959; Y10T 403/32581; Y10T 74/20462; Y10T 16/641; Y10T 4/20305; Y10T 4/20311
  See application file for complete search history.

(56) References Cited

U.S. PATENT DOCUMENTS

| | | | |
|---|---|---|---|
| 790,798 A * | 5/1905 | Lytle | F16C 11/04 403/116 |
| 4,076,267 A * | 2/1978 | Lipscomb | A63C 17/0033 280/400 |
| 4,590,961 A * | 5/1986 | Schumann | F16G 13/16 137/355.16 |

(Continued)

*Primary Examiner* — Emma K Frick
(74) *Attorney, Agent, or Firm* — Hemisphere Law, PLLC; Zhigang Ma (57) ABSTRACT

The present application relates to a self-balancing scooter and a main frame assembly thereof. The self-balancing scooter includes a first main frame and a cooperated second main frame. The first main frame includes a first connecting portion, the first connecting portion includes a first end surface, the first end surface defines a guide hole, and the guide hole is positioned between the center and the edge of the first end surface. The second main frame includes a second connecting portion, the second connecting portion includes a second end surface corresponding to the first end surface of the first connecting portion, the second end surface defines a conduit, the conduit is positioned between the center and the edge of the second end surface, the conduit is accommodated in the guide hole when the first connecting portion is assembled and connected to the second connecting portion.

18 Claims, 5 Drawing Sheets

(56) References Cited

U.S. PATENT DOCUMENTS

| | | | | |
|---|---|---|---|---|
| 4,625,507 | A * | 12/1986 | Moritz | H02G 11/006 |
| | | | | 59/78.1 |
| 7,954,777 | B2 * | 6/2011 | Bohm | F16M 11/10 |
| | | | | 248/274.1 |
| 8,408,565 | B2 * | 4/2013 | An | A63C 17/0033 |
| | | | | 280/87.042 |
| 8,453,424 | B2 * | 6/2013 | Jostmeier | H02G 11/006 |
| | | | | 248/49 |
| 9,376,155 | B2 * | 6/2016 | Ying | B62D 51/02 |
| 9,840,302 | B2 * | 12/2017 | Zeng | B60K 1/02 |
| 10,144,477 | B2 * | 12/2018 | Lankford | B60L 15/2036 |
| 10,167,037 | B2 * | 1/2019 | Ying | B62K 11/007 |
| 10,207,764 | B2 * | 2/2019 | Li | B62K 11/14 |
| 10,421,006 | B1 * | 9/2019 | Li | A63C 17/016 |
| 10,538,286 | B2 * | 1/2020 | Ying | B62K 11/02 |
| 2012/0091677 | A1 * | 4/2012 | Wu | A63C 17/016 |
| | | | | 280/87.042 |
| 2013/0238231 | A1 * | 9/2013 | Chen | B60L 15/20 |
| | | | | 701/124 |
| 2018/0037293 | A1 * | 2/2018 | Chen | G06T 5/002 |
| 2019/0031269 | A1 * | 1/2019 | Shang | B62M 6/45 |
| 2019/0077479 | A1 * | 3/2019 | Chen | B62K 11/007 |
| 2019/0193803 | A1 * | 6/2019 | Desberg | B62K 11/007 |
| 2019/0382065 | A1 * | 12/2019 | Shang | B62J 99/00 |

* cited by examiner

SELF-BALANCING SCOOTER AND MAIN FRAME ASSEMBLY THEREOF

FIELD OF THE DISCLOSURE

The disclosure relates to the field of scooter technologies, and more particularly to a self-balancing scooter and a main frame assembly thereof.

BACKGROUND

The self-balancing scooter, is also named as hoverboard or self-balancing board. The working principle of the self-balancing scooter is mainly based on a basic principle called "dynamic stability", which uses the gyroscope and acceleration sensor inside the scooter body to judge the posture state of the scooter body through the precision and high-speed central microprocessor. After calculating the appropriate instructions drive the motor to achieve a balanced effect.

The self-balancing scooter usually includes two connected main frames, a driving battery, a control circuit board, two hub motors, and two wheels, etc. The two main frames are configured to form a pair of articulated pads on which the rider places their feet. The driving battery is usually installed at the bottom, end of one of the main frames, and the control circuit board is usually installed at the bottom end of the other main frame. The hub motors are respectively located inside the wheels, and the wheels are mounted at the outer ends of the above-mentioned connected main frames. Since electrical connection is required between the driving battery and the control circuit board, electrical connection is also required between the control circuit board and the two hub motors, wires for performing electrical connection need to pass between the two main frames.

The two main frames are generally connected by a connecting shaft. To facilitate the passage of the wires, the connecting shaft is generally a hollow tube, so that the wires can pass through the through hole in the connecting shaft. Due to the generally cylindrical shape of the main body of the connecting shaft, during the operation of the self-balancing scooter, with the slight swing of the main frame, the connecting shaft usually generates continuous rotation. It may cause the internal wires to rotate at the same time, and it is possible to cause the wires to twist together and eventually break.

SUMMARY

On such basis, it is necessary to provide a self-balancing, scooter and a main frame assembly thereof. The self-balancing scooter is provided with a special wire channel to facilitate the passage of the wires and prevent the wires from being damaged.

In one embodiment, the present disclosure provides a self-balancing scooter. The self-balancing scooter includes a first main frame and a cooperated second main frame. The first main frame includes a first connecting portion, the first connecting portion includes a first, end surface, the first end surface defines a guide hole, and the guide hole is positioned between the center and the edge of the first end surface. The second main frame includes a second connecting portion, the second connecting portion includes a second end surface corresponding to the first end surface of the first connecting portion, the second end surface defines a conduit, the conduit is positioned between the center and the edge of the second, end surface, the conduit is accommodated in the guide hole when the first connecting portion is assembled and connected to the second connecting portion.

In one embodiment, the self-balancing scooter further comprises a connecting shaft, the first end surface and the second end surface defines are respectively defines a first connecting hole and a second connecting hole, and the connecting shaft extends through the first connecting hole and the second connecting hole to connect, the first connecting portion and the second connecting portion.

In one embodiment, the cross-section of the conduit and the guide hole at the connecting portion is respectively a shape of a portion of annulus, and the center of the annulus is located on, the axis of the connecting shaft.

In one embodiment, the radian range of the cross-section of the conduit at the connecting portion is 5~45 degrees, and the radian range of the cross-section of the guide hole at the connecting portion is 6~90 degrees.

In one embodiment, the first end surface of the first connecting portion further defines a second conduit, and the second conduit is positioned between the center and the edge of the first end surface; the second end surface of the second connecting portion defines a second guide hole, the second guide hole is positioned between the center and the edge of the second end surface; the second conduit is accommodated in the second guide hole when the first connecting portion is assembled and connected to the second connecting portion.

In one embodiment, the distance between the first end surface and the second end surface is 0.5 millimeters to 8 millimeters, when the first connecting portion is assembled and connected to the second connecting portion.

In one embodiment, an axis of the conduit is perpendicular to the second end surface.

In one embodiment, a main frame assembly of a self-balancing scooter is provided. The main frame assembly includes a first main frame and a cooperated second main frame. The first main frame includes a first connecting portion, the first connecting portion includes a first end surface, the first end surface defines a guide hole, and the guide hole is positioned between the center and the edge of the first end surface. The second main frame includes a second connecting portion, the second connecting portion includes a second end surface corresponding to the first end surface of the first connecting portion, the second end surface defines a conduit, the conduit is positioned between the center and the edge of the second end surface, the conduit is accommodated in the guide hole when the first connecting portion is assembled and connected to the second connecting portion.

In one embodiment, the self-balancing scooter further comprises a connecting shaft, the first end surface and the second, end surface defines are respectively defines a first connecting hole and a second connecting hole, and the connecting shaft extends through the first connecting hole and the second, connecting hole to connect the first connecting portion and the second connecting portion.

In one embodiment, the cross-section of the conduit and the guide hole at the connecting portion is respectively a shape of a portion of annulus, and the center of the annulus is located on, the axis of the connecting shaft.

In one embodiment, a self-balancing scooter is provided. The self-balancing scooter includes a first main frame, a second main frame, and a connecting shaft. The first main frame includes a first connecting portion, the first connecting portion includes a first end surface, a first guide hole, and a first connecting hole, an axis of the first guide hole and the first connecting hole are respectively perpendicular to the first end surface, the first connecting hole extends through the central position of the first end surface. The second main frame includes a second connecting portion, the second connecting portion includes a second end surface, a first conduit, and a second connecting hole, the axis of the first conduit and the second connecting hole are respectively perpendicular to the second end surface, the first end surface is parallel to the first end surface, the second connecting hole extends through the central position of the second end surface and is aligned with the first connecting hole. The connecting shaft extends through the first, and the second connecting holes thereby assembling and connecting the first and the second main frames together. In such a state, a distance between the first and the second end surfaces is 0.5 millimeters to 8 millimeters, the first conduit is accommodated in the first guide hole and matches the first guide hole in such a manner that the first conduit is limited to rotate 0 to 20 degrees relative to the first guide hole.

In one embodiment, the first connecting portion further defines a second conduit, and the first guide hole and the second conduit is positioned at two opposite sides of the first connecting hole.

In one embodiment, the second connecting portion further defines a second guiding hole, and the second conduit is accommodated in the second guide hole when the first connecting portion is assembled and, connected to the second, connecting portion.

In one embodiment, the second conduit matches the second guide hole in such a manner that the second conduit is limited to rotate 0 to 20 degrees relative to the second guide hole.

In one embodiment, a stiffener is provided on a hole wall of the first connecting hole.

In one embodiment, the cross-section of the first guide hole at the first end surface comprises a first arc, a second semicircle, a third arc, and a fourth semicircle that are sequentially connected.

In one embodiment, the center of the first arc coincides with the center of the third arc, and the center thereof is located at the axis of the first connecting hole.

In one embodiment, the connecting shaft comprises a screw, at least one spacer, at least one sleeve, and at least one nut.

In one embodiment, the diameter of the first connecting hole is equal to that of the second connecting hole, and the diameter of the screw is matched with that of the second connecting hole.

In one embodiment, the diameter of the second connecting hole is in the range of 8 millimeters to 30 millimeters.

The present application may have the following advantages. According to the above self-balancing scooter, a guide hole and a conduit are provided, and the wires can be arranged in the conduit. Therefore, the function of passing wires in the connecting shaft can be eliminated, and the connecting shaft can be designed to be solid. As such, with the same cross-sectional area of the connecting shaft, the strength of the solid connecting shaft is higher, and the bearing capacity of the entire self-balancing scooter is enhanced. In addition, by providing arc-shaped guide hole and conduit, when the two main frames are connected, they also have the effect of facilitating the wires and protecting the wires from being damaged due to rotation of the connecting shaft. By arranging the conduit and the guide hole, when the two main frames are connected, the alignment between the two main frames can be more conveniently achieved, and then the two main frames can be connected using the connecting shaft.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

Description of reference numerals: 100—main frame, 1—connecting portion, 11—columnar body, 12—connecting hole, 13—guide hole, 14—conduit, 15—hole wall, 16—stiffener, 17—end surface, 2—connecting shaft, 21—screw, 22—spacer, 23—sleeve, 24—nut

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover anon-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described, features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

As described above, in the prior art, the two main frames of the self-balancing scooter are usually connected through a hollow tubular connecting shaft, which both serves the purpose of mechanically connecting the main frames and achieving the electrical connection. When the self-balancing scooter is in operation, the connecting shaft usually rotates, and then the inner wires rotate simultaneously, it may causes the wires to twist together and eventually break.

To solve the above technical problem, as shown in FIG. 1 to FIG. 7, an embodiment of the present application provides a self-balancing scooter, wherein the self-balancing scooter includes two main frames 100 and a wire passage device. The wire passage device is disposed between the two main frames 100, that is, positioned at the end portion of the main frame 100. The wire passage device mainly includes two connecting portions 1 and a connecting shaft 2. The self-balancing scooter in the embodiment of the present application will be described in detail with reference to accompanying drawings as follows.

Figure 1:
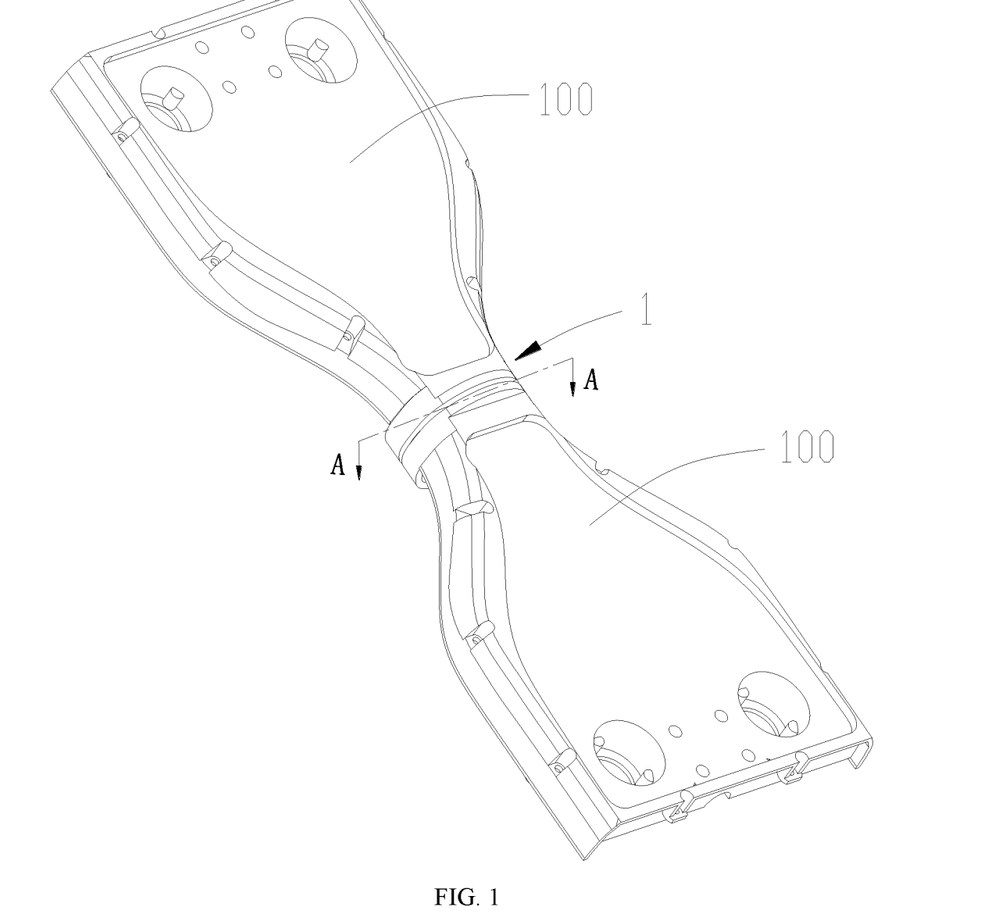
FIG. 1 is a schematic structural view of a self-balancing scooter including two main frames connected and assembled together, according to an embodiment of the present application.
Figure 2:
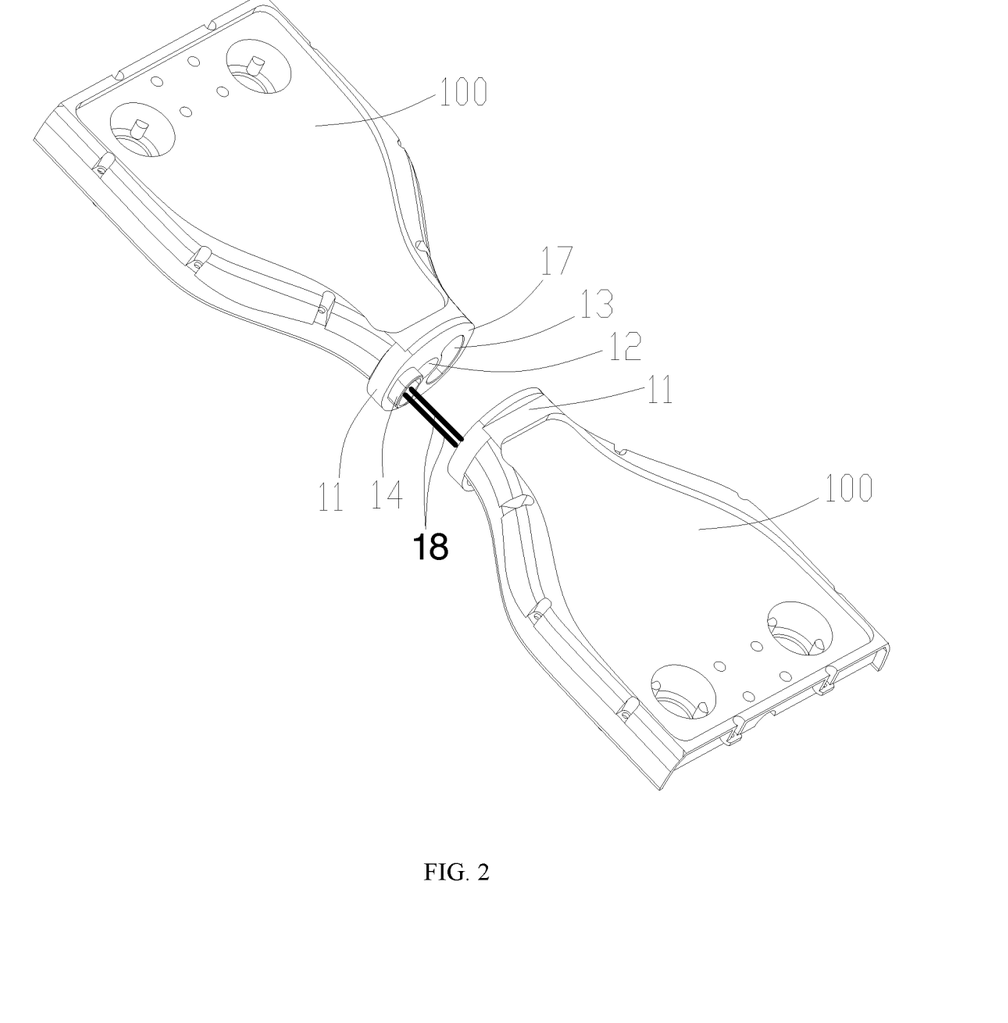
FIG. 2 is a schematic structural view of the two main frames of FIG. 1 in separated state.

As shown in FIG. 1 and FIG. 2, the self-balancing scooter includes two main frames 100, which has a substantially plate shape, are configured to form a pair of articulated pads on which the rider places their feet. For the main frame 100, the outer ends thereof, i.e., two opposite ends of the two main frames 100 as shown in FIG. 1, each can be used to install a wheel (not shown). The main frames 100 each define a connection portion 1 at an intermediate position between the two main frames 100, to facilitate the connection and installation between the two main frames 100. In practical applications, a balance control device, a gyroscope, a control sub-board, wheels, a main board, and the like are also mounted on the main frame 100 of the self-balancing scooter. The present embodiment just shows the structure related to the connection of the main frames, and the other structures have been omitted. It is believed that people skilled in the art understand and are familiar with those omitted structures.

Figure 3:
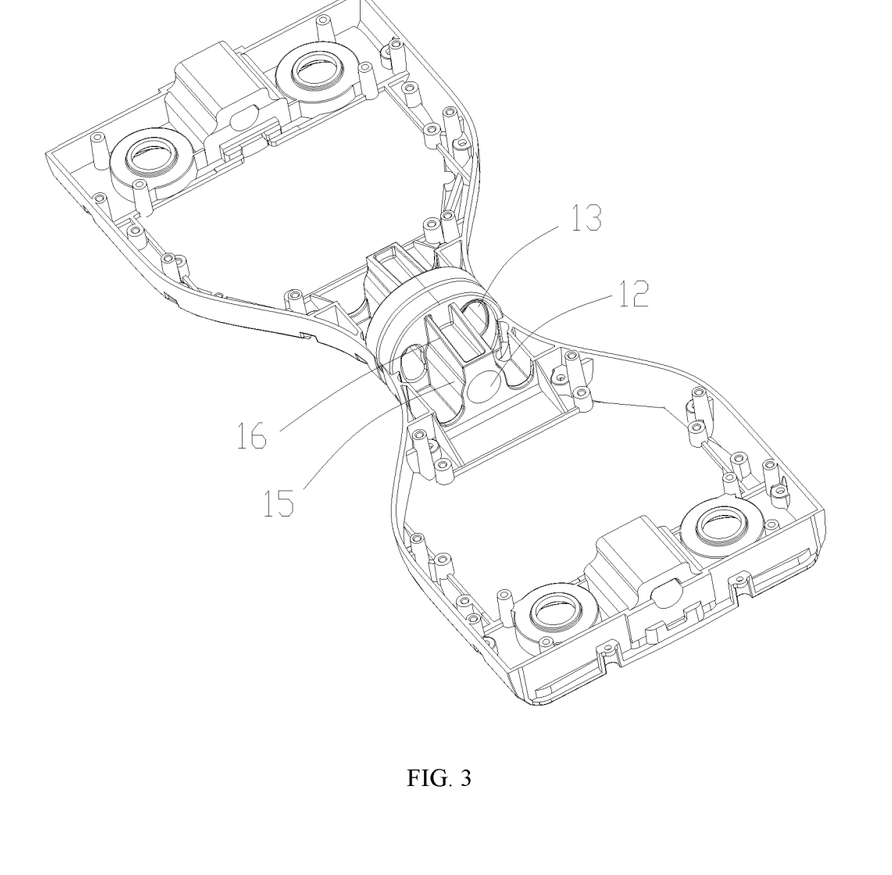
FIG. 3 is a schematic rear view of the main frame of FIG. 1.

From the front schematic view of the main frame of FIG. 2, and the rear schematic view of the main frame of FIG. 3, it can be find out that the connection portion 1 mainly includes two parts, one part is a substantially regular structure like a columnar body 11, and the other part is an irregular supporting structure closely attached to the columnar body 11. The columnar body 11 has a cylindrical shape with a circular cross-section. In the columnar body 11, a connecting hole 1 is defined along a direction perpendicular to the circular cross-section. The connecting hole 12 is located approximately at the central of the columnar body 11. The connection portion 1 further defines a hole wall 15 extends from the columnar body 11 along the length of the connecting hole 12. The upper end of the hole wall 15 is provided with a stiffener 16, and the stiffener 16 mechanically connects the columnar body 11 and the hole wall 15 to reinforce the strength of the connecting portion 1 while reducing the weight of the connecting portion 1.

Figure 4:
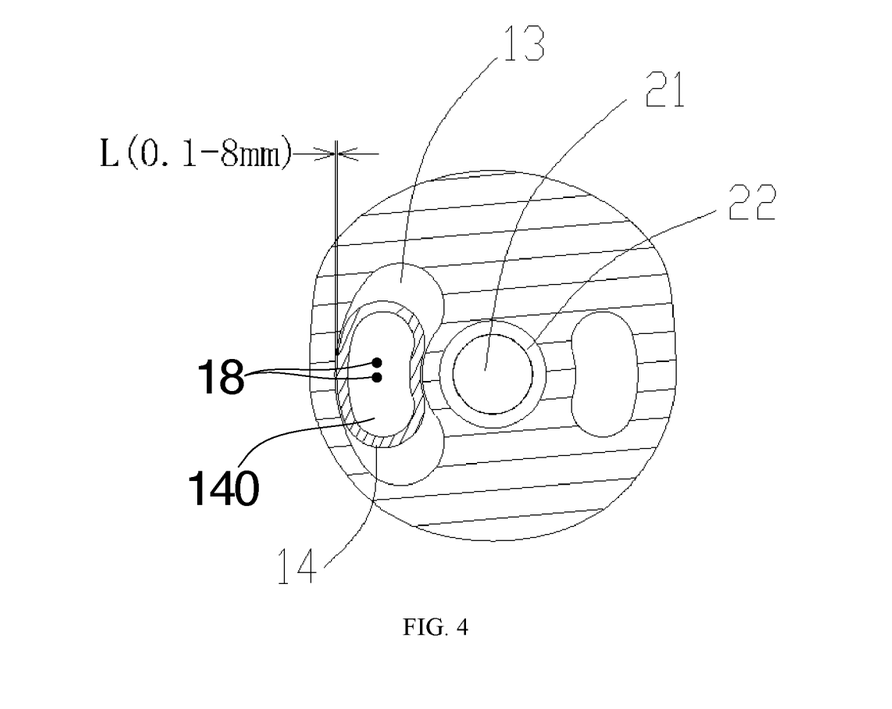
FIG. 4 is a cross-sectional schematic view taken along arrow A-A direction of the self-balancing scooter of FIG. 1.
Figure 5:
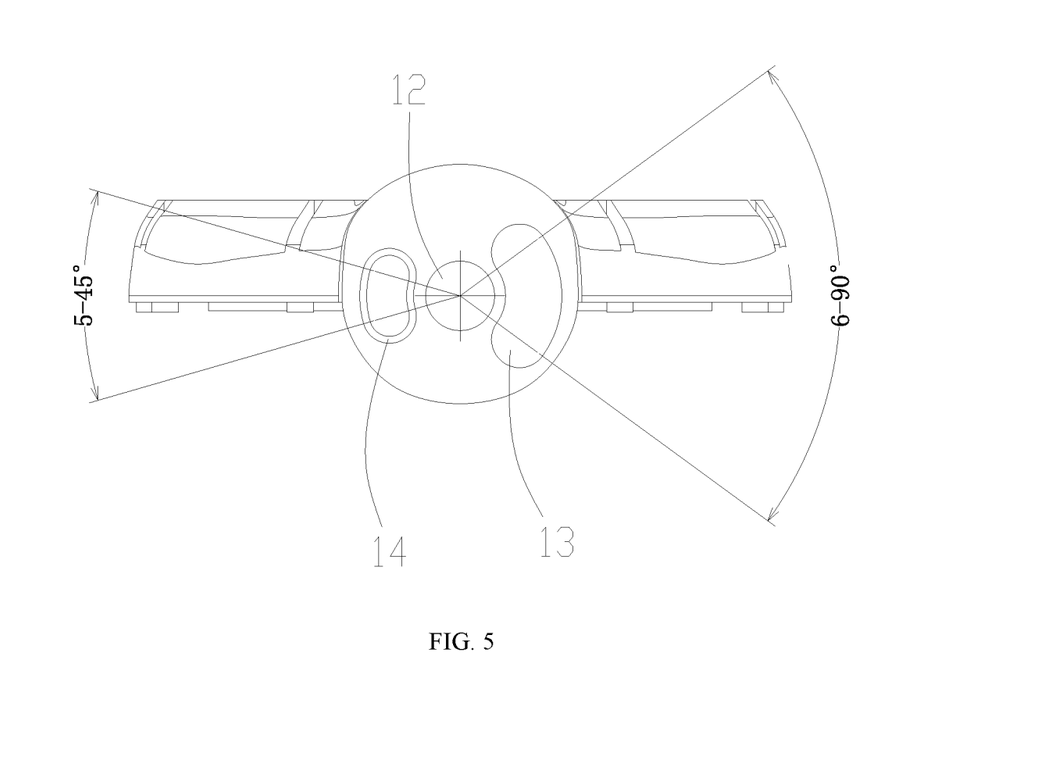
FIG. 5 is a schematic view of an end surface of the main frame of FIG. 1.

As shown in FIG. 2, FIG. 4, and FIG. 5, a conduit 14 is disposed at the connecting portion 1 of one of the main frames 100. Specifically, the conduit 14 is disposed on an end surface 17 of the columnar body 11, and a conduit hole 140 inside the conduit 14 extends and passes through the columnar body 11. Meanwhile, the other main frame 100 defines a guide hole 13 at a corresponding position. When the two main frames 100 are assembled and connected together, the conduit 14 is located in the guide hole 13, and the conduit hole 140 of the conduit 14 extends through the columnar body 11. The cross-section area of the conduit hole 140 of the conduit 14 is larger than the cross-section area of the connector installed at the end of the wires 18, so that the wires 18 and the connector can be smoothly passed through the conduit hole 140 of the conduit 14, and thereby achieving the function of convenient alignment.

In the present embodiment, the two main frames 100 are respectively provided with the guide hole 13 and the conduit 14, and the guide hole 13 and the conduit 14 are substantially symmetrically disposed at both sides of the connecting hole 12. When the two main frames 100 are mounted together, the conduit 14 is located in the corresponding guide hole 13, and the position of the conduit 14 and the guide hole 13 on one main frame 100 and the position of the conduit 14 and the guide hole 13 on the other main frame 100 are symmetrical with respect to the axis of the connecting shaft 2 described later. Of course, the number and structure of the guide hole 1 and the conduit 14 are not limited thereto. In other embodiments, just one guide hole 13 may be disposed on one main frame 100, and one corresponding conduit 14 is disposed on another main frame 100; or two guide holes 13 are provided at one main frame 100, and two conduits 14 are provided at the other main frame 100. The guide hole 13 and the conduit 14 may also be of other shapes, numbers, and positions. For example, the shape is circular, the number is three, and may be distributed around the connecting hole 12 like a triangle. It is just necessary to satisfy that the guide hole 13 is larger than the conduit 14 and does not block the rotation of the two main frames 100 within a limited rotation angle.

As shown in FIG. 4 and FIG. 5, the cross-section of the guide hole 13 in the connecting portion 1 is substantially similar to a portion of annulus, it is a generally regular closed graph that can be constituted by multiple connected circular arcs. The cross-section of the conduit 14 in the connecting portion 1 also is substantially similar to a portion of annulus, it is a generally regular closed graph that can be connected by multiple circular arcs. Specifically, in the direction as shown in FIG. 4, the left and right sides of the cross-section of the conduit 14 are composed of two arcs with the same center, and the upper and lower sides thereof are composed of two semicircles. The radian of the arc may be 5 to 45°, preferably 15 to 25°, and the center of the arc is located on the axis of the connecting hole 12.

Similarly, according to the direction shown in FIG. 4, the left and right sides of the cross-section of the guide hole 13 are composed of two arcs with the same center, and the upper and lower sides thereof are composed of two semi-circles. Wherein the radian of the above two concentric arcs may be 6~90°, preferably 28~60°, and the center of the arcs is located on the axis of the connecting hole 12. It is necessary to ensure that the radian of the arc of the cross-section, of the conduit 14 is smaller than that of the guide hole 13.

From the above, it can be get that the center of the arc constituted the cross-section of the guide hole 13 is located on the axis of the connecting hole 12, and the center of the arc constituted the cross-section of the conduit 14 is located on the axis of the connecting hole 12, and of course, the connecting hole 12 is coaxial with the connecting shaft 2 described later. In the direction of arc, the arc length of the cross-section of the conduit 14 is smaller than that of the guide hole 13. With this design, when the two main frames 100 are mounted together, the twist angles of the two main frames 100 can be limited. In this embodiment, the limited twist angles of the two main frames 100 may be limited to 20°, that is, the twist angle between the two main frames 100 ranges from 0 to 20°.

The above description mainly describes the specific structure of the connecting portion 1 at the end position of the main frame 100. In the following, the mechanical connection of the two main frames 100 will be described.

Figure 6:
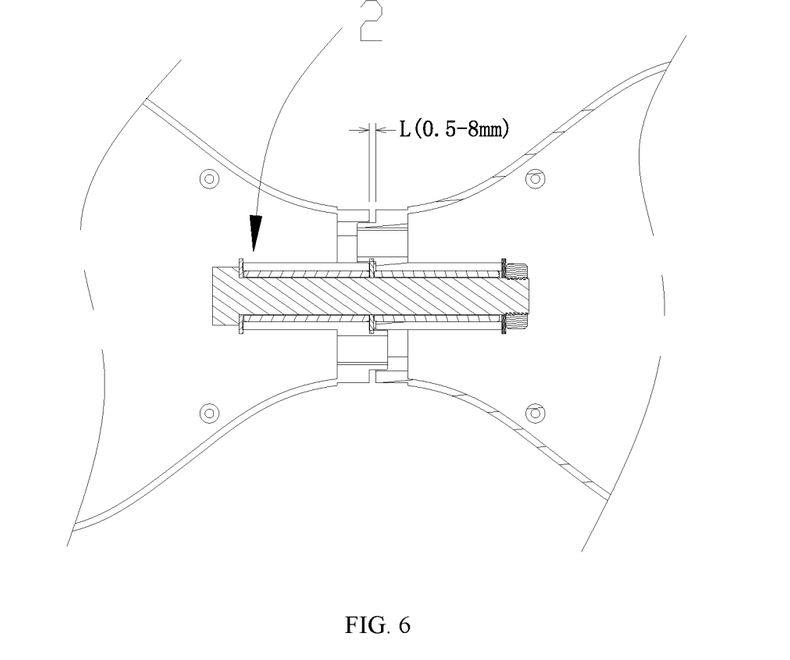
FIG. 6 is a cross-sectional schematic view of a connection shaft of the self-balancing scooter according to an embodiment of the present application.
Figure 7:
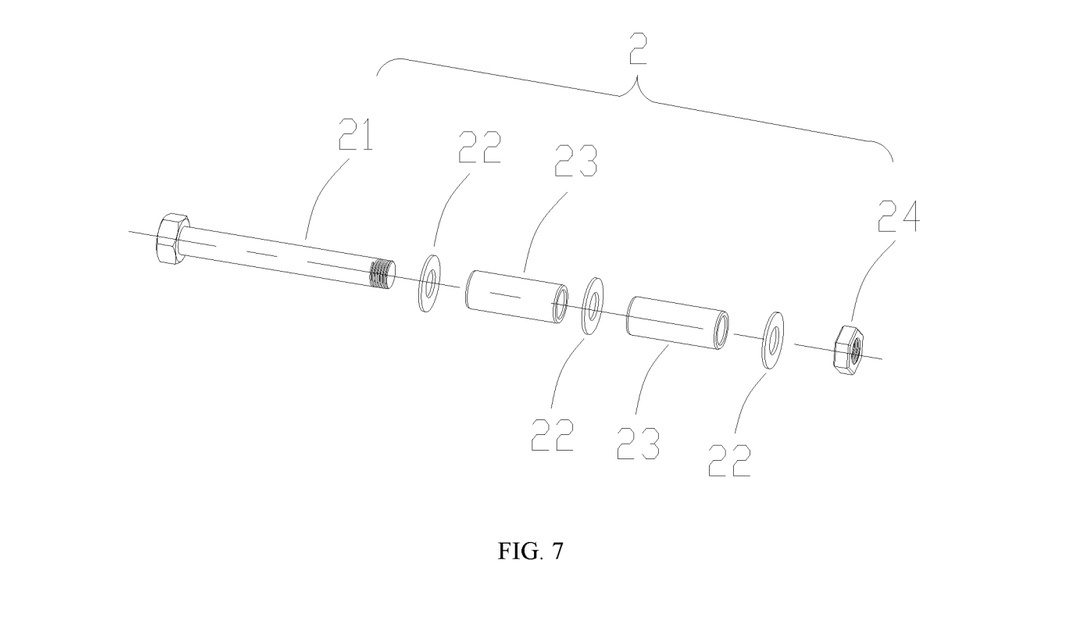
FIG. 7 is an exploded schematic view of the connecting shaft of the self-balancing scooter according to an embodiment of the present application.

As shown in FIG. 6 and FIG. 7, in an embodiment of the present invention, two main frames 100 may be connected and assembled together by the connecting shaft 2, wherein the connecting shaft 2 mainly includes at least one screw 21 at least one spacer 22, at least one sleeve 23, and at least one nut 24. The number of the at least one spacer 22 is three, the number of the at least one sleeve 23 is two, and both of the number of the screw 21 and the nut 24 are one.

When the main frames 100 are specifically assembled and connected, the shaft sleeve 23 and the spacer 22 are sleeved on the screw 21 pass through the connecting holes 12 of the two main frames 100, and then the nut 24 is finally screwed on, the end of the screw 21, thereby achieving the connection of the two main frames 100.

In the embodiment, the diameter of the screw 21 is matched with the diameter of the sleeve 23, and the diameter of the sleeve 23 is matched with the diameter of the connecting hole 12. The screw 21 may be a solid body or a hollow body. The diameter of the connecting hole 12 can be in the range of 8 mm-30 mm.

In addition, referring back to FIG. 2, the end surface 17 is respectively provided on the connecting portion of the main frame 100. When the two main frames 100 are assembled and connected together, the distance between the end surfaces 17 of the two connecting portions 1 is 0.5 mm to 8 mm. In addition, the conduit 14 may be disposed perpendicular to the end surface 17. And the connecting shaft 2 extends perpendicular to the end surface 17.

In the self-balancing scooter provided by the embodiment of the present application, the guide hole 13 and the conduit 14 are disposed at the end of the main frame 100 to facilitate the wires 18 to pass through the interior of the conduit 14. The conduit 14 and the guide hole 13 just slightly oscillate during the work of the self-balancing scooter, and will not rotate relative to each other, thereby preventing the internal wires 18 in the conduit 14 from twisting and breaking and further preventing the wires 18 from being damaged. In addition, by arranging the conduits 14 and the guide holes 13, when the two main frames 100 are connected and assembled together, the alignment between the two main frames 100 can be more conveniently performed, and then the two main frames 100 can be easily connected using the connecting shaft 2. Finally, the arc length of the cross-section of the conduit 14 in the direction of the arc is smaller than the arc length of the cross-section of the guide hole 13 in the direction of the arc, it plays the role of limiting the twist angle of the main frame 100.

In another way, the self-balancing scooter ire one embodiment of the present disclosure includes a first main frame, a second main frame, and a connecting shaft 2. The first main frame includes a first connecting portion, the first connecting portion includes a first end surface, a first guide hole, a second conduit, and a first connecting hole. An axis of the first guide hole, the second conduit, and the first connecting, hole are respectively perpendicular to the first end surface, the first connecting hole extends through the central position of the first end surface, and the first guide hole and the second conduit are both positioned between the central and the edge of the first end surface. The second main frame includes a second connecting portion, the second connecting portion includes a second end surface, a first conduit, a second guide hole, and a second connecting hole. The axis of the first conduit, the second guide hole, and the second connecting hole are respectively perpendicular to the second end surface. The first end surface is parallel to the second end surface. The second connecting hole extends through the central position of the second end surface and is aligned with the first connecting hole. The first conduit and the second guide hole are both positioned between the central and the edge of the second end surface. The connecting shaft 2 extends through the first and the second connecting holes thereby assembling and connecting the first and the second main frames together, in such a state, a distance between the first and the second end surfaces is 0.5 millimeters to 8 millimeters, the first conduit is accommodated in the first guide hole and matches the first guide hole in such a manner that the first conduit is limited to rotate 0 to 20 degrees relative to the first guide hole. The second conduit matches the second guide hole in such a manner that the second conduit is limited to rotate 0 to 20 degrees relative to the second guide hole. The cross-section of the first guide hole at the first end surface comprises a first arc, a second semicircle, a third arc, and a fourth semicircle that are sequentially connected. The center of the first arc coincides with the center of the third arc, and the center thereof is located at the axis of the first connecting hole. The cross-section of the first conduit has a similar shape to that of the first guide hole, but with a shorter arc length and a smaller semicircle.

In addition, it can be understood that the use of the connecting shaft 2 can also be omitted when the mating structure between the guide hole 13 and the conduit 14 has sufficiently strength.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A self-balancing scooter, comprising:
   a first main frame comprising a first connecting portion, the first connecting portion comprising a first end surface, the first end surface defining a guide hole, the guide hole being positioned between a center and an edge of the first end surface; and
   a second main frame comprising a second connecting portion, the second connecting portion comprising a second end surface corresponding to the first end surface of the first connecting portion, the second end surface defines a conduit, the conduit being positioned between a center and an edge of the second end surface, the conduit being accommodated in the guide hole, and the first connecting portion is assembled and connected to the second connecting portion;

wherein the self-balancing scooter further comprises a connecting shaft, the first end surface is provided with a first connecting hole and the second end surface is provided with a second connecting hole, the connecting shaft extends through the first connecting hole and the second connecting hole to connect the first connecting portion and the second connecting portion, the guide hole is located at a side of the first connecting hole, and the conduit is located at a side of the second connecting hole;

wherein wires are arranged in a conduit hole inside the conduit and pass through both the conduit and the guide hole for electrical connection;

wherein left and right sides of a cross-section of the guide hole respectively are two concentric arcs with a center on an axis of the first connecting hole, upper and lower sides of the cross-section of the guide hole respectively are two semicircles, and the first connecting hole is coaxial with the connecting shaft;

wherein left and right sides of a cross-section of the conduit respectively are two concentric arcs with a center on an axis of the second connecting hole, upper and lower sides of the cross-section of the conduit respectively are two semicircles, and the second connecting hole is coaxial with the connecting shaft;

wherein an angle range of the two concentric arcs at the left and right sides of the cross-section of the conduit is smaller than another angle range of the two concentric arcs at the left and right sides of the cross-section of the guide hole, arc lengths of the two concentric arcs at the left and right sides of the cross-section of the conduit are respectively smaller than corresponding ones of arc lengths of the two concentric arcs at the left and right sides of the cross-section of the guide hole and thereby a twist angle between the first main frame and the second main frame is limited.

2. The self-balancing scooter according to claim 1, wherein each of the cross-section of the conduit at the second connection portion and the cross-section of the guide hole at the first connecting portion is an annulus, and a center of the annulus is located on an axis of the connecting shaft.

3. The self-balancing scooter according to claim 1, wherein the first end surface of the first connecting portion further defines a second conduit, and the second conduit is positioned between the center and the edge of the first end surface; the second end surface of the second connecting portion defines a second guide hole, the second guide hole is positioned between the center and the edge of the second end surface; the second conduit is accommodated in the second guide hole.

4. The self-balancing scooter according to claim 1, wherein a distance between the first end surface and the second end surface is 0.5 millimeters to 8 millimeters, when the first connecting portion is assembled and connected to the second connecting portion.

5. The self-balancing scooter according to claim 1, wherein an axis of the conduit is perpendicular to the second end surface.

6. The self-balancing scooter according to claim 1, wherein the angle range of the two concentric arcs at the left and right sides of the cross-section of the conduit at the second connecting portion is 5~45 degrees, and the another angle range of the two concentric arcs at the left and right sides of the cross-section of the guide hole at the first connecting portion is 6~90 degrees.

7. The self-balancing scooter according to claim 1, wherein the twist angle as limited is in a range from 0 to 20 degrees.

8. The self-balancing scooter according to claim 1, wherein the two concentric arcs and the semicircles of the cross-section of the guide hole are connected to form a closed shape; and the two concentric arcs and the semicircles of the cross-section of the conduit are connected to form a closed shape.

9. A self-balancing scooter, comprising:
a first main frame comprising a first connecting portion, the first connecting portion comprising a first end surface, a first guide hole, and a first connecting hole, an axis of the first guide hole and an axis of the first connecting hole being respectively perpendicular to the first end surface, the first connecting hole extending through a central position of the first end surface, and the first guide hole being located at a side of the first connecting hole;

a second main frame comprising a second connecting portion, the second connecting portion comprising a second end surface, a first conduit, and a second connecting hole, an axis of the first conduit and an axis of the second connecting hole being respectively perpendicular to the second end surface, the second end surface being parallel to the first end surface, the second connecting hole extending through a central position of the second end surface and being aligned with the first connecting hole, and the first conduit being located at a side of the second connecting hole; and a connecting shaft extending through the first and the second connecting holes thereby assembling and connecting the first and the second main frames together, wherein in such a state, a distance between the first and the second end surfaces is 0.5 millimeters to 8 millimeters, the first conduit is accommodated in the first guide hole and matches the first guide hole in such a manner that the first conduit is limited to rotate 0 to 20 degrees relative to the first guide hole;

wherein wires are arranged in a conduit hole inside the first conduit and pass through both the first conduit and the first guide hole for electrical connection.

10. The self-balancing scooter according to claim 9, wherein the first connecting portion further defines a second conduit, and the first guide hole and the second conduit is positioned at two opposite sides of the first connecting hole.

11. The self-balancing scooter according to claim 10, wherein the second connecting portion further defines a second guide hole, and the second conduit is accommodated in the second guide hole when the first connecting portion is assembled and connected to the second connecting portion.

12. The self-balancing scooter according to claim 11, wherein the second conduit matches the second guide hole in such a manner that the second conduit is limited to rotate 0 to 20 degrees relative to the second guide hole.

13. The self-balancing scooter according to claim 9, wherein a stiffener is provided on a hole wall of the first connecting hole.

14. The self-balancing scooter according to claim 9, wherein a cross-section of the first guide hole at the first end surface comprises a first arc, a second semicircle, a third arc, and a fourth semicircle that are sequentially connected in that order.

15. The self-balancing scooter according to claim 14, wherein a center of the first arc coincides with a center of the third arc, and the center thereof is located at the axis of the first connecting hole.

16. The self-balancing scooter according to claim 9, wherein the connecting shaft comprises a screw, at least one spacer, at least one sleeve, and at least one nut.

17. The self-balancing scooter according to claim 16, wherein a diameter of the first connecting hole is equal to that of the second connecting hole, and a diameter of the screw is matched with that of the second connecting hole.

18. The self-balancing scooter according to claim 17, wherein a diameter of the second connecting hole is in the range of 8 millimeters to 30 millimeters.

* * * * *